US006942384B2

(12) United States Patent
Schmidt (10) Patent No.: US 6,942,384 B2
(45) Date of Patent: Sep. 13, 2005

(54) HOUSING FOR PROBE USED TO MEASURE TEMPERATURE THROUGH A CONTAINER WALL

(75) Inventor: Rémy Schmidt, Offwiller (FR)

(73) Assignee: De Dietrich Process Systems, Zinswiller (FR)

( * ) Notice: Subject to any disclaimer, the term of this patent is extended or adjusted under 35 U.S.C. 154(b) by 192 days.

(21) Appl. No.: 09/861,096

(22) Filed: May 18, 2001

(65) Prior Publication Data

US 2001/0046253 A1 Nov. 29, 2001

(30) Foreign Application Priority Data

May 19, 2000  (FR) .............................................. 00 06463

(51) Int. Cl.[7] .......................... G01K 1/14; G01K 13/00; G01K 1/08
(52) U.S. Cl. ........................ 374/208; 374/141; 374/150
(58) Field of Search ................................ 374/150, 141, 374/147, 208; 203/2, 99

(56) References Cited

U.S. PATENT DOCUMENTS

| 2,012,151 | A | * | 8/1935 | Whitter ....................... 374/141 |
| 2,838,935 | A | * | 6/1958 | Di Cecio et al. ........... 374/208 |
| 2,997,587 | A | * | 8/1961 | Mims ......................... 374/147 |
| 3,845,661 | A | * | 11/1974 | Hollweck et al. ........... 374/208 |
| 4,464,066 | A | * | 8/1984 | Cappuccilli ................. 374/141 |
| 4,509,868 | A | * | 4/1985 | Ronconi et al. ............. 374/141 |
| 4,747,700 | A | * | 5/1988 | Lenz et al. ................. 374/135 |
| 4,791,585 | A | * | 12/1988 | Maki et al. ................. 364/557 |
| 4,886,371 | A | * | 12/1989 | Fondin ........................ 374/141 |
| 5,062,700 | A | * | 11/1991 | Lenz et al. ................. 374/135 |
| 5,234,527 | A |   | 8/1993 | Nozawa et al. |
| 5,244,544 | A | * | 9/1993 | Lang et al. ..................... 203/2 |
| 5,258,929 | A | * | 11/1993 | Tsuchida ..................... 364/557 |
| 5,318,363 | A | * | 6/1994 | Mauric ........................ 374/208 |
| 5,323,429 | A | * | 6/1994 | Roarty et al. ............... 376/249 |
| 5,718,512 | A | * | 2/1998 | Ngo-Beelmann ........... 374/148 |
| 5,756,908 | A | * | 5/1998 | Knollmeyer et al. ....... 73/866.5 |
| 6,062,126 | A | * | 5/2000 | Johnson et al. ............... 99/285 |
| 6,220,749 | B1 | * | 4/2001 | Wyker ......................... 374/141 |
| 6,264,049 | B1 | * | 7/2001 | Shteynberg ................ 215/11.2 |
| 6,324,963 | B1 | * | 12/2001 | Cirasole ....................... 99/285 |
| RE37,988 | E | * | 2/2003 | Uss .............................. 99/343 |
| 6,579,006 | B1 | * | 6/2003 | Pariseau ..................... 374/162 |
| 2002/0102568 | A1 | * | 8/2002 | Cronimus ................... 137/551 |

FOREIGN PATENT DOCUMENTS

| DE | 19 13 267 A |   | 9/1970 |   |
| FR | 2 022 633 |   | 7/1970 |   |
| JP | 2000126028 A | * | 10/1998 | ............ A47J/27/00 |

* cited by examiner

*Primary Examiner*—Gail Verbitsky
(74) *Attorney, Agent, or Firm*—Davis & Bujold, P.L.L.C.

(57) ABSTRACT

In order to decrease thermal interference related to heating or cooling fluid (14) contained in the exterior double envelope of the container, the invention consists of positioning the measurement point away toward the interior of the container by forming a local deformation in the wall (12) in the form of a non-penetrating recessed area (21) which serves as a housing for a contact temperature measurement probe (17). The wall (12) of the recessed area becomes progressively thinner until it is minimal at the level of the base (22), against which the temperature measurement is taken, resulting in a more precise, quicker reading. This invention is of interest within the chemical industry, particularly to manufacturers and users of temperature measurement devices.

20 Claims, 6 Drawing Sheets

HOUSING FOR PROBE USED TO MEASURE TEMPERATURE THROUGH A CONTAINER WALL

The present invention concerns a device for housing a probe or sensor used to measure the internal temperature in a container, such as for example a reactor, a storage tank, a column, or similar container, through its wall.

In order to control a chemical reaction, it is often essential to measure the temperature of the reactive environment inside the reactor. This information not only makes it possible to act retroactively upon the heating or cooling means in the reactor to obtain or maintain the desired temperature, but also to ensure that the chemical reaction is progressing correctly. In practice, a sudden rise in temperature often means that the reaction is out of control, and rapid detection of such a situation can be critical for the safety of employees, equipment, and the environment.

For this reason, a device to effectively measure the temperature of reactor contents is widely sought. However, it must meet several requirements.

First, for safety reasons, the device must be sealed and resistant to internal reactor pressure. It must also measure temperature quickly, dependably, and precisely while limiting interference from the temperature of the exterior environment or the temperature of the reactor's heating or cooling means.

Furthermore, for reasons of simplicity and economy, the temperature measurement device must adapt to existing types of probes and must adapt readily to all types of reactors, or even other equipment, all at the lowest possible cost.

Finally, the device must allow easy access to the sensor from the exterior so it can be quickly and simply changed without interfering with the reaction in progress inside the reactor.

The conventional prior art method of measuring temperature inside a reactor consisted of forming a tubulure in the reactor wall and then introducing into it a temperature probe surrounded by a thermometric case. Thus, the end of the probe contacts the reactive environment in order to measure its temperature.

The use of such a tube means that the reactor wall must be punctured and subsequently, the double walls must be plugged at the opening in order to form a passageway to the interior of the reactor for the probe.

Since the tubulure penetrates the reactor wall completely, it is imperative that a high performance seal form a completely watertight closure in the tubulure once the sensor is positioned. It is of utmost importance, for reasons of both safety and economy, to prevent any risk of leaks once the reactor is filled.

It is difficult and expensive to achieve such a temperature measurement system. It requires a thermometric sheath as well as a sealing and attachment device for maintaining the probe once it is introduced. This device poses numerous sealing problems which can be dangerous.

Moreover, since the tubulure penetrates the reactor, it is impossible to withdraw the probe while the reactor is operating. If the probe is defective or unsuitable, the reactor must be emptied before it can be replaced.

For all these reasons, the present system for measuring internal temperature in a container is unsatisfactory.

To eliminate sealing problems, another measurement device using a contact type temperature probe has also been proposed by the prior art.

This time the temperature probe is maintained in contact with a thinner portion of the reactor wall and it measures the temperature of the reactor contents through the wall. Thus, it is not necessary to form a penetrating opening.

However, with this device, the probe is not only in contact with the thinner portion of the reactor wall, but it is also very close to the heating or cooling fluid contained in the double envelope or the coil. Thus, because of the thermal conductivity of the massive wall and the proximity to the heating or cooling fluid, the fluid exerts considerable influence on the temperature as measured by the probe, resulting in a particularly inaccurate measurement that it not representative of the interior temperature. This problem worsens when the internal reactor surface is covered with a layer of enamel, which constitutes an effective thermal insulation between the reactive environment and the probe.

This defect can be overcome by extending the thinned portion of the reactor wall over a larger area, thereby increasing the distance between thermal interference and the measurement point placed in the center of the thinner zone. However, in this case, there is a risk that the reactor will exert too much pressure on the extended thin area and that the wall might not be able resist.

This prior art device has too many major drawbacks to respond to present day needs.

The object of the present invention is to provide a housing for a temperature measurement probe performing quick, reliable and precise measurements of the interior temperature, while minimizing thermal interference caused by the heating or cooling means and/or the external environment and eliminating the disadvantages of the systems described above.

To resolve this technical problem, the principle of the present invention consists of placing the measurement point toward the interior of the container by making a local deformation in the wall in the form of a non-penetrating area that is recessed toward the interior of the container and which serves as a housing for a contact temperature probe.

The thickness of the container wall decreases progressively in the area of this recessed area until it becomes minimal at the measurement point, which preferably corresponds to the point that is closest to the interior of the container.

A conventional contact temperature probe is then simply introduced into the housing device according to the invention until it contacts the front zone of the recess corresponding to the thinner area of the container wall, through which the temperature of the reactive environment is measured.

Through the use of the housing device according to the invention, measurement takes place far from any source of interference, specifically, thermal interference. Moreover, since the housing is surrounded by the liquid whose temperature is to be measured, there is a considerably larger thermal exchange surface. As a result, the measurement is reliable, precise, representative of the interior temperature, and far less subjected to inertia since the contact wall is thin.

Furthermore, since the area of reduced thickness extends over only a small surface, the wall can resist pressure exerted by the reactor contents without any problem.

In addition, since the housing device according to the invention does not penetrate the interior of the reactor, there is no sealing problem. The expensive, problematic use of a tubulure is thus eliminated. Likewise, no thermometric sheath is required.

Furthermore, since the probe is not plunged directly inside the reactor, it can be quickly and easily changed or withdrawn without affecting the progress of the reaction inside the container in any way whatsoever.

The housing device according to the invention offers the combined advantages of a probe that can be plunged inside the reactor and a contact probe, but with none of the drawbacks associated with either type.

The housing device of the invention is easy to manufacture and adapt to any type of reactor, column, storage tank or other storage container. Moreover, most existing contact temperature measurement probes can be readily adapted to it.

Other characteristics and features of the invention will be apparent from reading the following detailed description, taken in conjunction with the attached drawings, in which.

The housing device for a contact probe measuring temperature through a container wall according to the present invention will now be described in detail with reference to FIGS. 1 through 8. Equivalent elements shown in the various drawings will bear the same reference numerals.

Figure 1:
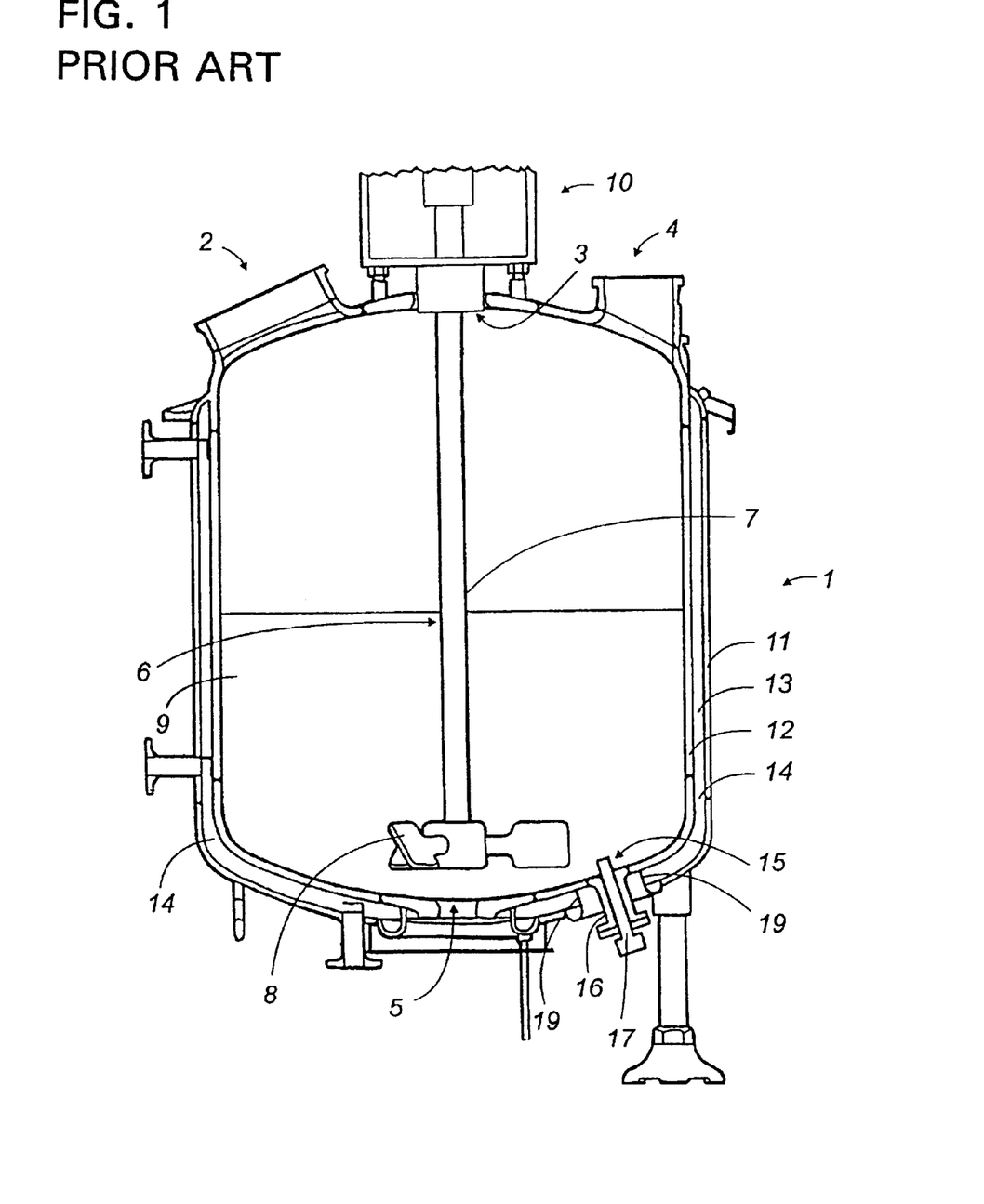
FIG. 1 is a schematic longitudinal cross section of a reactor equipped with a tubulure and a temperature probe that is plunged inside the reactor according to the prior art.
Figure 3:
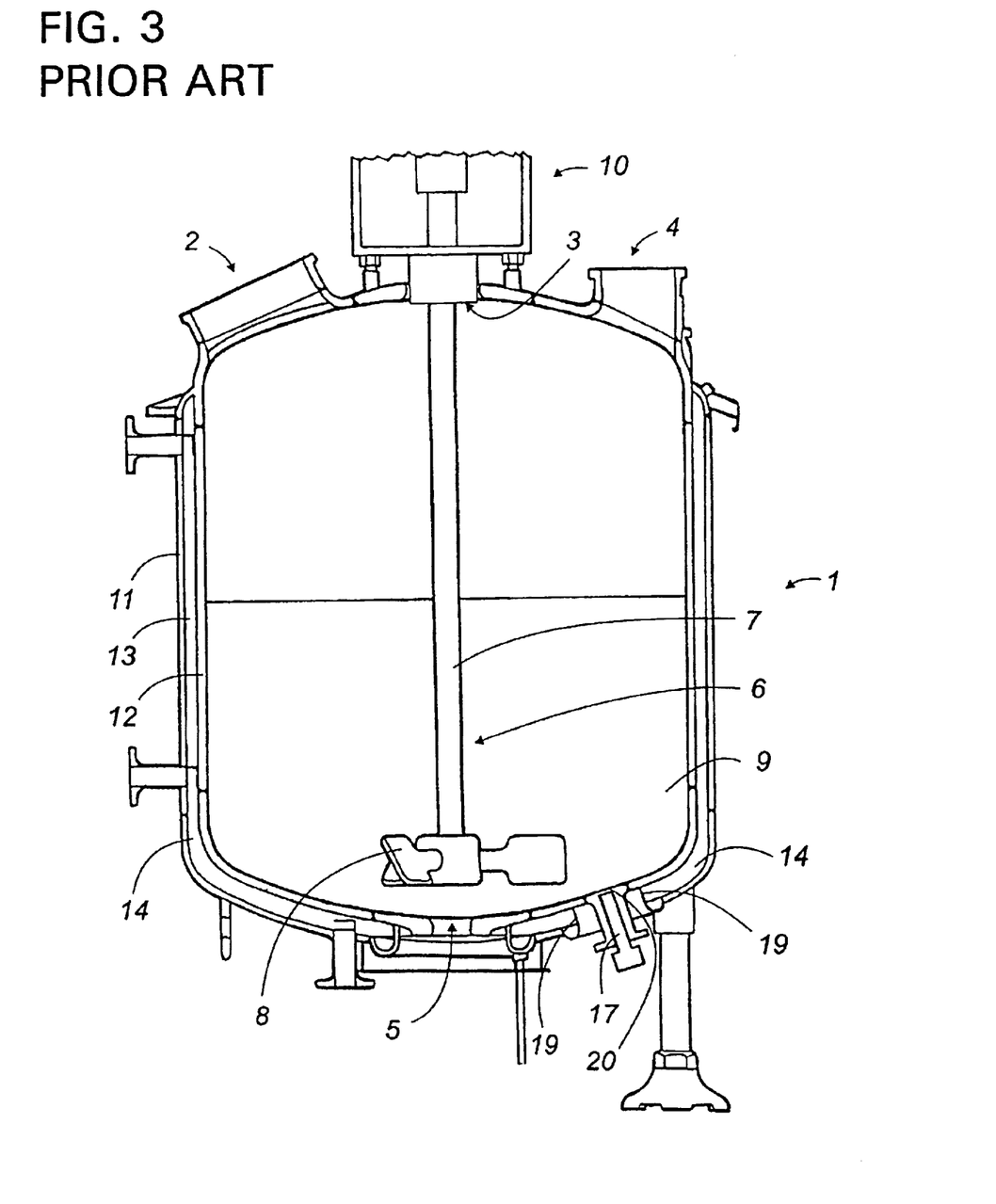
FIG. 3 is a schematic longitudinal cross-section of a reactor equipped with a contact temperature probe attached to the reactor wall according to the prior art.
Figure 5:
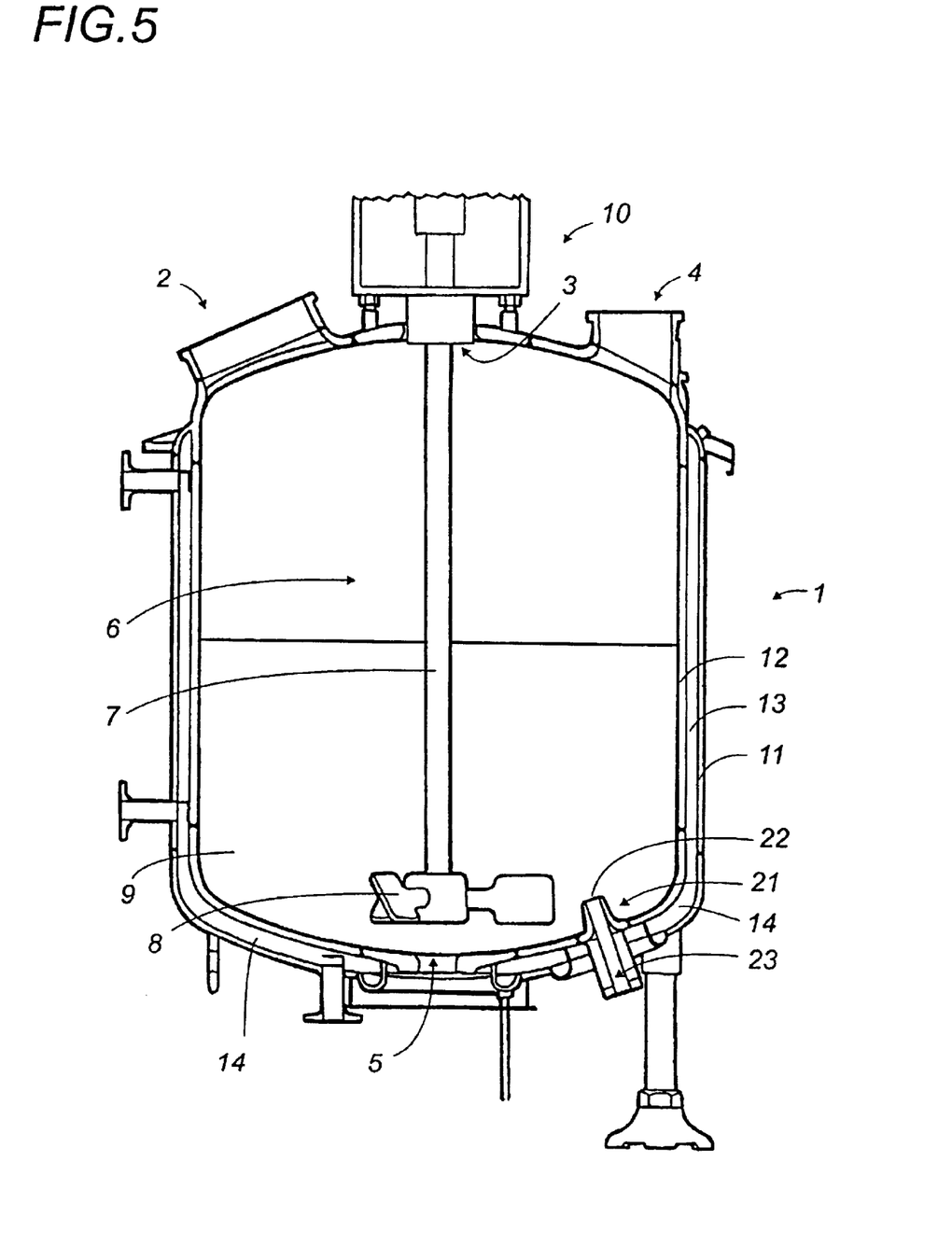
FIG. 5 is a schematic longitudinal cross-section of a reactor equipped, according to the present invention, with a housing device for the temperature probe which takes measurements by contact with the wall.

FIGS. 1, 3 and 5 are schematic drawings of a chemical reactor 1 with three upper openings 2, 3 and 4 which may be used for introducing different reagents, solvents, and catalysts, or for admitting various instruments or accessories (agitator, mole, probes, gripping tools, etc.) into reactor 1 and with a lower orifice 5 for completely emptying its contents through a drain valve.

Reactor 1 is equipped with a mechanical agitator 6 with a rod 7 passing through central opening 3 and plunging toward the lower portion of the reactor. Rod 7 terminates in a unit of three inclined blades which stir the contents 9 of reactor 1 when the rod is rotated by a drive motor 10 located outside the reactor.

A second wall 11 surrounds the internal wall 12 of reactor 1 some distance away from it, forming a closed annular space 13 between the two walls. This space 13 will hold hot or cold heat exchanging fluid 14 for regulating the internal temperature of the reactor according to the well-known double envelope or jacket principle.

Figure 2:
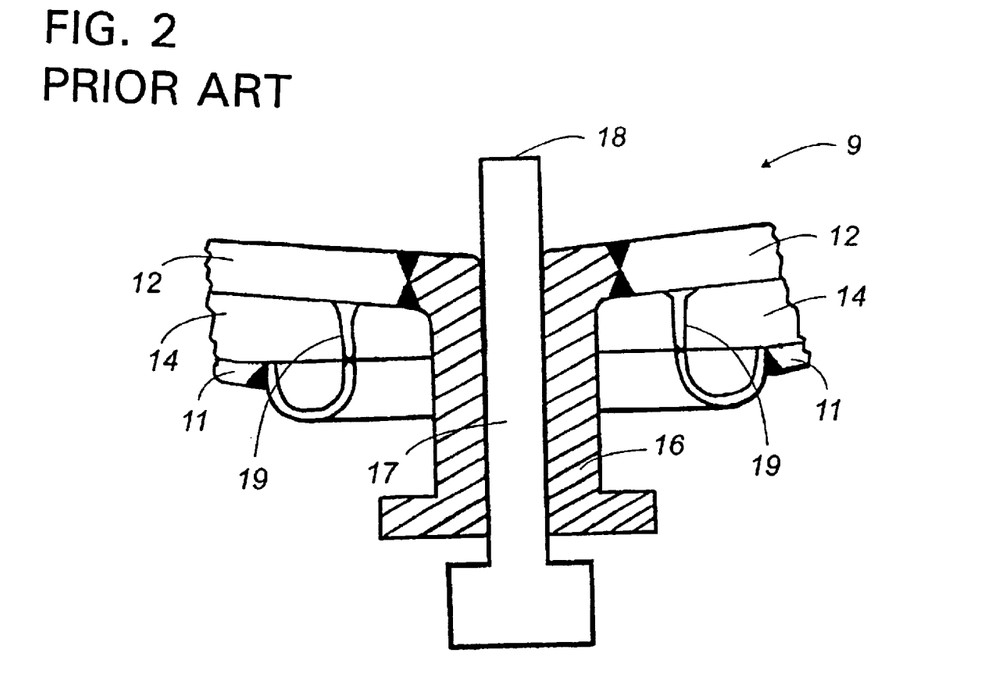
FIG. 2 is an enlarged cross-section of the portion of the reactor of FIG. 1 that is equipped with a tubulure and a temperature probe that is plunged inside the reactor according to the prior art.

FIGS. 1 and 2 show the conventional temperature measurement system of the prior art using a probe plunged inside the reactor.

Reactor 1 has in its lower portion an orifice 15 allowing access to the interior. Said orifice 15 constitutes the interior extremity of a tubulure 16 originating inside the reactor, passing through the double envelope and opening at an exterior projection.

Tubulure 16 is for the introduction of a temperature measurement probe 17, the measurement end 18 of which is plunged into liquid 9 inside the reactor. The internal diameter of tubulure 16 must be generally larger than the external diameter of the probe to allow insertion.

Sealed area 13 which holds fluid 14 for heating or cooling reactor 1 is interrupted in one place by partition 19 near the temperature measurement device.

Such a device must always comprise seals and insulation (not shown) to eliminate any risk of leaks when probe 17 is place inside tubulure 16, as well as a thermometric sheath.

This expensive, problematic device is hardly satisfactory.

Figure 4:
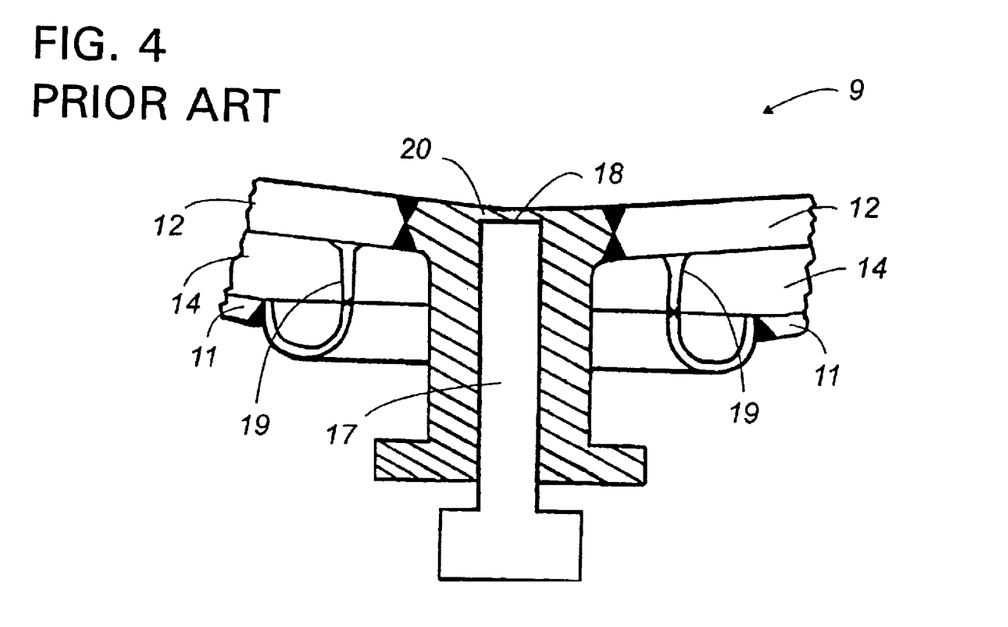
FIG. 4 is an enlarged cross-section of the portion of the reactor of FIG. 3 that is equipped with a contact temperature probe attached to the reactor wall according to the prior art.

Another temperature measurement device proposed in the prior art is shown in FIGS. 3 and 4.

In this case probe 17 is a probe for measuring temperature by contact with a wall. It is placed against internal wall 12 of reactor 1 near a thinner area 20 in said internal wall 12.

The thinner area 20 remains small in size in order to resist internal pressure from reactor 1.

Probe 17 measures the temperature of wall 12 at the thinner area 20 which the probe extremity contacts and where measurement takes place. Since wall 12 is less thick at the thinner region 20 and in direct contact with the liquid 9 on its other surface, this measurement is considered to provide a good approximation of the temperature of liquid 9 contained in the reactor.

However, the internal wall 12 of the reactor is also in contact, on its other surface, with heating or cooling fluid 14 as far as blocking wall 19.

Probe extremity 18 where the measurements are performed is very close to hot or cold heat exchanging fluid 14. Therefore, the measurement is strongly influenced by the thermal conductivity of massive wall 12 and by the proximity of heat exchanging fluid 14. Rapid temperature variations in the reactive environment are masked due to the inertia of massive wall 12.

A device such as this has too long a response time and delivers imprecise results.

FIG. 5 illustrates a reactor 1 which is similar to the preceding reactors, but this time equipped with the housing device of the instant invention.

Interior wall 12 of reactor 1 has been locally deformed toward the inside at the lower portion so as to form a recess 21 pointing toward the inside of reactor 1, preferably perpendicular to the wall.

Near recess 21, wall 12 decreases progressively in thickness until it is of minimal thickness at base 22, constituting a front surface facing towards the interior of the container.

The recess defines on the outside of reactor 1 a hollow space 23 capable of housing local temperature measurement contact probe 17. Probe 17, shown in FIG. 6, can be inserted into housing 23 with its sensitive end 18 placed against the thinner wall 22. Thus, temperature measurement takes place through thin base wall 22.

Because of the deformation in wall 12, the measurement point on base 22 of recess 21 is located away from the double envelope and from the hot or cold heat exchanging fluid 14 it contains. Therefore, disruptions in thermal measurement due to proximity of heat exchanging fluid 14 are reduced considerably.

In addition, recess 21 forms a projection which is completely immersed in reactive environment 9. At this level and over a large surface, wall 12 is in contact with only the liquid 9 inside the reactor and is not in simultaneous contact with heat exchanging fluid 14.

Thus, the thermal exchange surface is increased considerably and there is less interference than in the prior art device shown in FIGS. 3 and 4.

Nevertheless, since the minimally thick zone is limited to the small surface of base 22, wall 12 is capable of resisting pressure exerted by the reactor contents.

When it is placed inside the housing of the invention, the entire upper portion 24 of probe 17 is surrounded by a thin metal envelope, which is itself surrounded by liquid 9. Since the wall of base 22 is, in addition, very thin, probe 17 is subjected to nearly the same conditions as the probe plunged inside the device shown in FIGS. 1 and 2. Temperature measurement is precise, with improved response time.

Thus, wall 12 is not perforated in any portion of recess 21, which does not penetrate the wall. This eliminates the problem of sealing the housing device as in the prior art. Furthermore, the housing device according to the present invention does not require use of a tubulure or a thermometric sheath.

With the housing device of the invention, the measurement point is located in an area where reactive liquid 9 is at a temperature that is representative of the temperature of the remainder of the reactor contents; it does not rise or fall falsely due to direct contact with the double envelope.

Additionally, the recess according to the invention is preferably formed in the lower portion of reactor 1, as shown in FIG. 5. Thus, the probe is placed in an area that is always full, away from thermal surface flux, and where the reactive environment 9 is homogeneous since it is thoroughly mixed by agitator 6.

Nevertheless, this example is in no way limitative, as the housing device of the invention can be formed on any part of the reactor wall whatsoever using a simple, inexpensive procedure.

The housing device of the invention is designed to maintain probe 17 in the measurement position and it may comprise a support for this purpose.

Figure 6:
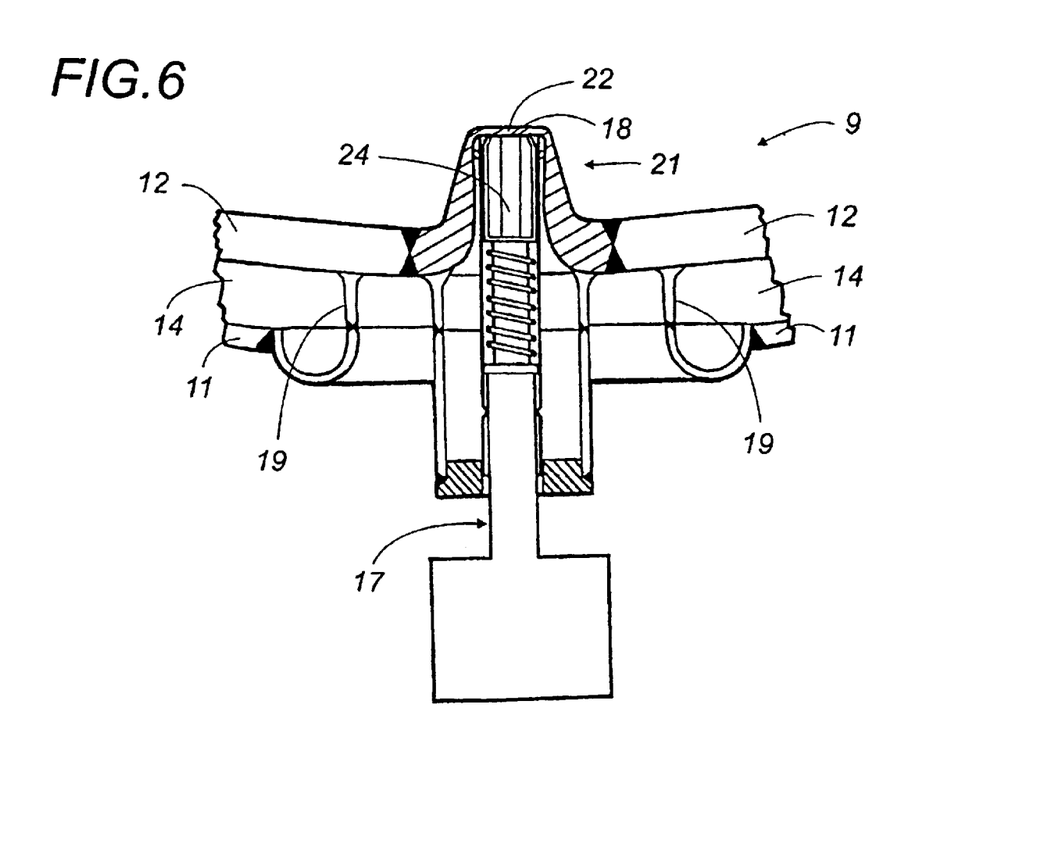
FIG. 6 is an enlarged cross-section, similar to that of FIG. 6, of the portion of the reactor of FIG. 5 comprising a housing device according to the invention with a contact temperature probe positioned therein.

In FIG. 6, as an example, there is shown a contact probe (of the SLR type) attached by plunging it inside housing 23. However, the housing device of the invention can be used with any type of contact temperature probe (for example, DR and SVR type probes, SLR, DR and SVR are model nomenclature for bayonet and push type contact temperature probes made by the chemical equipment company De Dietrich et CIE), since a person skilled in the art can easily conceive of a support device adaptable to the type of probe desired. For example, it is possible to add a bayonet type support in housing 23.

It is apparent that the shape and dimension of recess 21 and housing 23 are not limited to the examples described and shown. It is easy to foresee how they can be modified to better respond to the specific technical requirements of a situation without departing from the scope of the present invention.

Advantageously, with the housing device of the invention, probe 17 can be quickly and easily positioned, removed, or replaced from the exterior of the reactor without any effect at all on the reaction in progress.

It should be noted that in the case of a reactor equipped with one or more coils surrounding its internal wall, the system described above applies in the same way. Actually, in this case, the same problem of thermal interference may arise with the coil or coils as with the double envelope. The housing device of the invention, fashioned as before without any additional difficulties, responds advantageously to the problem.

In the case of a reactor without any double envelope or coil surrounding its internal wall, the above procedure also applies. Actually, the temperature of the exterior environment could be considered a source of interference when measuring the temperature of the reactor's contents if the measurement point of the probe is not located far enough away and insulated from it sufficiently. Here again, the device of the invention can significantly improve precision and speed of measurement.

The temperature probe housing according to the invention is particularly well-suited to being formed within the wall of a reactor, as shown in FIGS. 1 through 7. However, it is important to note that its use is not limited to this application.

The housing device can also be incorporated in the wall of any type of reactor, enamel or not, whatever its design or method of temperature regulation.

Similarly, the housing device of the invention is not limited to use in a reactor, but may be used on any type of container when it is useful to measure the temperature of its contents. For example, such a device might be provided on a container, a storage tank, a distillation column, or other device.

Figure 8:
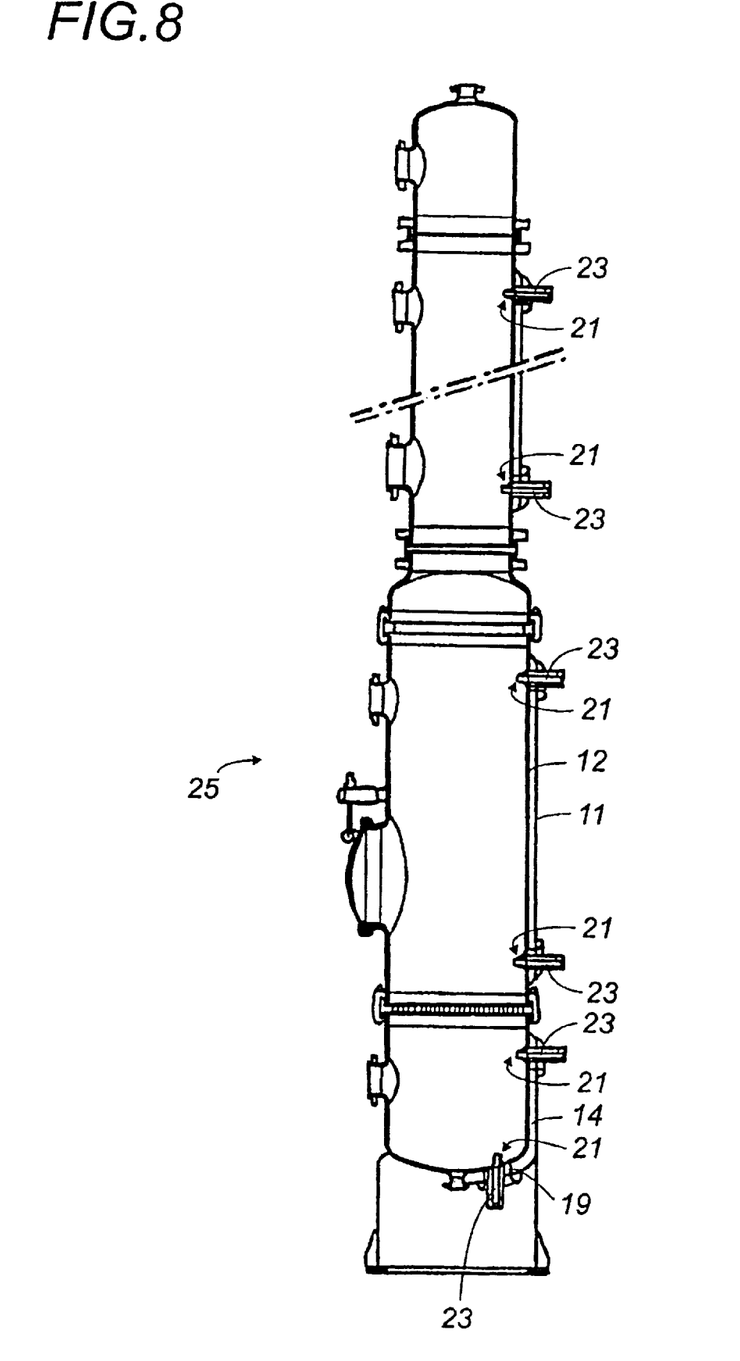
FIG. 8 is a schematic longitudinal cross-section of a column, for example, a distillation column, equipped with a plurality of housing devices for contact temperature probes according to the present invention mounted in the lateral wall of said column.

In FIG. 8 there is shown by way of example an industrial distillation column 25 comprising a plurality of housing devices according to the invention, each of which may be equipped with a probe for measuring temperature through the wall by contacting the wall.

Figure 7:
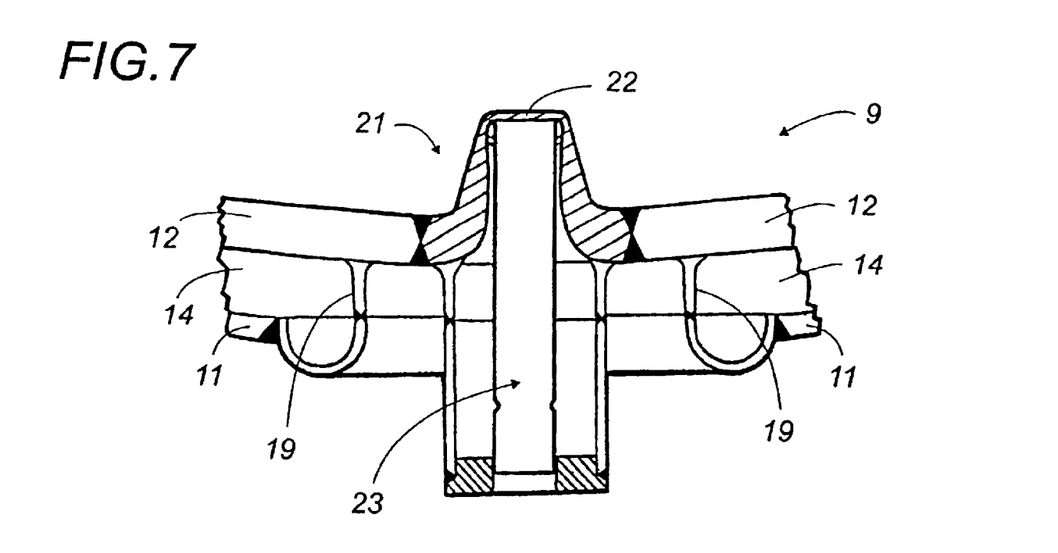
FIG. 7 is an enlarged cross-section of the portion of the reactor of FIG. 5 comprising, according to the present invention, a housing device for the temperature probe which takes measurements by contact with the wall.

In this variation the housing devices according to the invention are not located in only the lower wall of the container, as in the preceding example of a reactor shown in FIGS. 5 through 7. Five housing devices according to the invention are also disposed horizontally at different levels along the lateral wall of the column. This allows the temperature of the contents to be measured at various heights along the distillation column corresponding to different distillation stages.

Obviously the number and arrangement of the different housing devices according to the invention as given here are meant to be illustrative and in no way restrictive.

Since formation of the recessed portion is a simple, inexpensive procedure, it can effectively be done at any location and on nearly any type of industrial equipment. Therefore, the device of the present invention can be adapted just as readily to a reactor as to a column, a storage tank, or other device, on any portion of its wall.

What is claimed is:

1. A housing device for a probe used to measure an internal temperature in a container, the container having an interior wall (12) separated from an exterior wall (11) by an annular space (13) for accommodating a heat exchanging fluid (14), which at least partially regulates a temperature of the container;

wherein the housing device is formed in the container (1) in a lower portion thereof, the housing device comprises a localized deformation in the interior wall (12) of the container (1, 25) which extends inwardly toward an interior of the container (1, 25) to form a wall projection located to be completely immersed within a reactive environment of the container (1, 25), the housing device has a recessed area (21), formed in a rear surface thereof, which does not completely penetrate through the interior wall (12) and defines a hollow space (23) in communication with the exterior of the container for accommodating a temperature sensing end of the probe therein for measuring a temperature of the reactive environment within the container (1,25) by contact between the temperature sensing end of the probe and a base of the wall projection so as to position the probe at a measurement location spaced radially inward from the interior wall (12) of the container so that an entire surface of the wall projection is completely immersed within a reactive environment of the container (1, 25) when a temperature is measured.

2. The housing device for the probe according to claim 1, wherein a thickness of the recessed area (21), formed in the interior wall (12) of the container (1, 25) progressively decreases so that a thinnest portion of the recessed area (21) projects furthest into an interior of the container an is a measurement location for taking the measurement.

3. The housing device for a probe according to claim 1, wherein a temperature measurement takes place through a base (22) of the recessed area (21), formed in the interior wall (12) of the container (1, 25), which extends furthest into an interior of the container.

4. The housing device for a probe according to claim 1, wherein the projection extends in a reactive environment (9) within an interior of the container and is located away from a thermal surface flux.

5. The housing device for a probe according to claim 1, wherein the housing device receives a probe (17) which is received within the hollow space.

6. The housing device for a probe according to claim 1, wherein the housing device is capable of receiving at least one of a bayonet and a push type contact probe (17).

7. The housing device for the probe according to claim 1, wherein the housing device comprises means for retaining the probe (17) in a temperature measuring position.

8. The housing device for the probe according to claim 7, wherein the means for maintaining the probe (17) in a temperature measuring position is a bayonet device.

9. The housing device for the probe according to claim 1, wherein the heat exchanging fluid (14) circulates in a double envelope (13).

10. The housing device for the probe according to claim 1, wherein the heat exchanging fluid (14) circulates in a coil.

11. The housing device for the probe according to claim 1, wherein the housing device is formed in the interior wall (12) of the container, and the interior side of the interior wall (12) is coated with an enamel layer.

12. The housing device for the probe according to claim 1, wherein the housing device is formed in the interior wall (12) of the container, and the container is a reactor (1).

13. The housing device for the probe according to claim 1, wherein the housing device is formed in the wall of the container, and the container is a column.

14. The housing device of the probe according to claim 1, wherein the housing device is formed in the wall of the container, and the container is a distillation column (25) and wherein the housing device extends substantially horizontally, in a lateral wall of the container, at a level of one of a distillation step of the distillation column (25).

15. A housing device for a probe used to measure an internal temperature in a container, the container having an interior wall (12) separated from an exterior wall (11) by an annular space (13) for accommodating a heat exchanging fluid (14), which at least partially regulates a temperature of the container;

wherein the housing device comprises a localized deformation in the interior wall (12) of the container (1,25) which extends inwardly toward an interior of the container (1, 25) to form a wall projection located to be completely immersed within a reactive environment of the container (1, 25), the housing device has a recessed area (21), formed in a rear surface thereof, which does not completely penetrate through the interior wall (12) and defines a hollow space (23) in communication with the exterior of the container for accommodating a temperature sensing end of the probe therein for measuring a temperature of the reactive environment within the container (1, 25) by contact between the temperature sensing end of the probe and a base of the wall projection so as to position the probe at a measurement location spaced radially inward from the interior wall (12) of the container so that an entire surface of the wall projection is completely immersed within a reactive environment of the container (1, 25) when a temperature is measured; and a side wall of the temperature sensing end of the probe is spaced from an inwardly facing side wall of the recessed area (21).

16. The housing device for the probe according to claim 15, wherein the temperature measurement takes place at the base (22) of the hollow space (23) corresponding to a portion of the wall projection that extends farthest into the container (1).

17. The housing device for the probe according to claim 15, wherein the base (22) of the hollow space (23) is immersed in a reactive environment (9) in an area spaced substantially away from thermal surface flux of the container.

18. The housing device for the probe according to claim 15, wherein the housing device is formed on a lower portion of the container (1).

19. The housing device for the probe according to claim 15, wherein the housing device receives a probe (17) which is attached by securing the measurement probe (17) in the hollow space (23) of the housing.

20. A housing device for a probe used to measure an internal temperature in a container, the container having an interior wall (12) separated from an exterior wall (11) by an annular space (13) for accommodating a heat exchanging fluid (14), which at least partially regulates a temperature of the container;

wherein the housing device comprises a localized deformation in the interior wall (12) of the container (1, 25) which extends inwardly toward an interior of the container (1, 25) to fore a wall projection located to be completely immersed within a reactive environment of the container (1, 25), the housing device has a recessed area (21), formed in a rear surface thereof, which does not completely penetrate through the interior wall (12) and defines a hollow space (23) in communication with the exterior of the container for accommodating a temperature sensing end of the probe therein for measuring a temperature of the reactive environment within the container (1, 25) by contact between the temperature sensing end of the probe and a base of the wall projection so as to position the probe at a measurement location spaced radially inward from the interior wall (12) of the container so that an entire surface of the wall projection is completely immersed within a reactive environment of the container (1, 25) when a temperature is measured; and a side wall of the temperature sensing end of the probe is spaced from an inwardly facing side wall of the recessed area (21) so that only a base of the temperature sensing end of the probe is in contact with the inwardly facing surface of the recessed area (21).

* * * * *